United States Patent [19]

Gerth

[11] 4,148,235
[45] Apr. 10, 1979

[54] COUPLING FOR JOINING A BALL NUT TO A MACHINE TOOL CARRIAGE

[75] Inventor: Howard L. Gerth, Knoxville, Tenn.

[73] Assignee: The United States of America as represented by the United States Department of Energy, Washington, D.C.

[21] Appl. No.: 891,097

[22] Filed: Mar. 28, 1978

[51] Int. Cl.² ........................................... B23B 21/00
[52] U.S. Cl. .................................. 82/21 R; 82/24 R; 82/27; 74/424.8 R
[58] Field of Search ................. 82/21 R, 22, 24 R, 27; 74/424.8 R, 424.8 NA

[56] References Cited

U.S. PATENT DOCUMENTS

| 2,756,606 | 7/1956 | Staples | 74/424.8 R |
| 3,398,598 | 8/1968 | Gress, Jr. | 74/424.8 R |
| 3,398,599 | 8/1968 | Hill | 74/424.8 R |
| 3,548,693 | 12/1970 | Romi | 82/24 R |
| 3,665,782 | 5/1972 | Loftus | 74/424.8 R |
| 3,733,940 | 5/1973 | Harman et al. | 82/21 R |
| 3,913,412 | 10/1975 | Hart et al. | 74/424.8 R |

Primary Examiner—Leonidas Vlachos
Attorney, Agent, or Firm—Dean E. Carlson; Stephen D. Hamel; Earl L. Larcher

[57] ABSTRACT

The present invention relates to an improved coupling for joining a lead screw ball nut to a machine tool carriage. The ball nut is coupled to the machine tool carriage by a plurality of laterally flexible bolts which function as hinges during the rotation of the lead screw for substantially reducing lateral carriage movement due to wobble in the lead screw.

5 Claims, 3 Drawing Figures

COUPLING FOR JOINING A BALL NUT TO A MACHINE TOOL CARRIAGE

This invention was made in the course of, or under, a contract with the United States Department of Energy.

The present invention relates generally to machine tools employing carriages displaceable by lead screw mechanisms and more particularly to an improved coupling for joining a lead screw ball nut to a carriage of a machine tool.

Machine tools, such as lathes and milling machines, utilize carriages for supporting the workpiece and the machine working tool and for displacing either the workpiece along one axis and/or the machine tool along another axis to machine the workpiece to the desired dimensions. In precision machining operations it is necessary that machine components be fabricated in such a manner as to minimize error in the desired dimensions of the workpiece. The utilization of lead screws for displacement of the carriages in machine tools has led to some problems, especially in precision machining where the final workpiece tolerances are within a microinch range. Normally in a machine tool employing a lead screw, the slides are connected through a ball nut to the machine slide for translating the rotational movement of the lead screw into linear motion of the carriage along preselected paths. The displacement of the carriages is predetermined by the operation of the lead screw through suitable numerical controls or other precision control mechanisms. The problem associated with utilizing lead screws is that even in carefully made lead screws linearity measurements show that the lead screws have axial bows in the range of about 0.0001 to 0.005 inch which introduce considerable wobble of the lead screw as it rotates to drive the tool or workpiece carriage. This wobble is translated into unregulated lateral motion of the tool and/or workpiece carriage which will detract from the accuracy required for the machining operations. Hence, ultraprecision machining is considerably hampered due to the presence of lead screw wobble even with wobble in the magnitude of the aforementioned range.

Accordingly, it is a primary goal of the present invention to substantially minimize or obviate the lateral motion in the tool or workpiece carriage due to the wobble in the lead screw while maintaining accurate axial displacement of the carriage. This goal is achieved by employing an improved coupling for joining the ball nut of the lead screw to the machine carriage. This improved coupling is provided by employing a plurality of laterally flexible bolts for joining the ball nut to the machine carriage. The bolts are provided with a lateral flexible or hinge-like motion by providing the bolts with axially separated segments of reduced cross-section which, in effect, form hinges which bend to take up the lateral motion or wobble of the lead screw within the ball nut while simultaneously maintaining a rigid joint for coupling the ball nut to the carriage for assuring minimal error in axial displacement of the latter.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for the purpose of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

Figure 1:
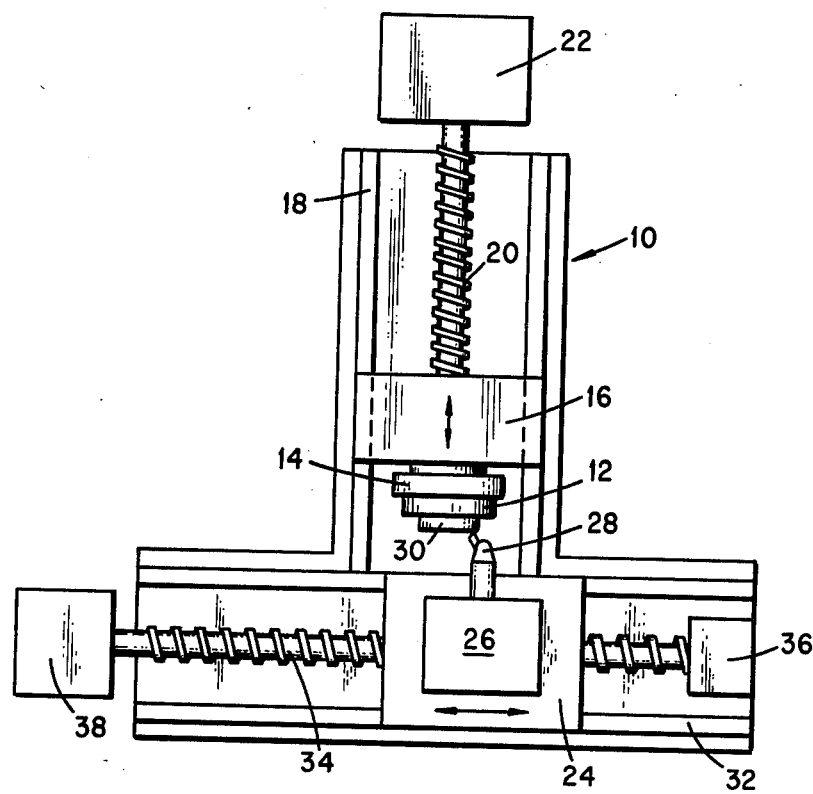
FIG. 1 is a perspective illustration showing in schematic form a machine tool having carriages displaceable on the X and Y axes by lead screws.

With reference to FIG. 1 of the accompanying drawings the machine tool 10, which may be a lathe or the like, is shown comprising a geared chuck 12 for supporting a workpiece with the geared chuck 12 being rotated by a spindle 14 which, in turn, is supported by carriage 16. The carriage 16 is displaced along the Y axis of the machine tool by moving the carriage 16 on slide 18 by the selective rotation of lead screw 20 which is turned by a motor 22 at the desired speed for precise positioning of the workpiece with respect to the cutting tool of the machine tool. The machine tool is also provided with a carriage 24 for supporting a tool post 26 having a suitable cutting tool 28 attached thereto. The workpiece 30 supported in the geared chuck 12 is positioned in a suitable orientation on the Y axis while the machine tool 28 is displaced along the X axis by moving the carriage 24 along slide 32 by the rotation of lead screw 34. A bearing 36 which may be an air bearing or any other suitable low friction mechanism is shown at one end of the lead screw 34. The rotation of the lead screw for the desired displacement of the tool carriage 24 along the X axis of the machine tool is achieved by the operation of motor 38 through any suitable control mechanism.

Figure 2:
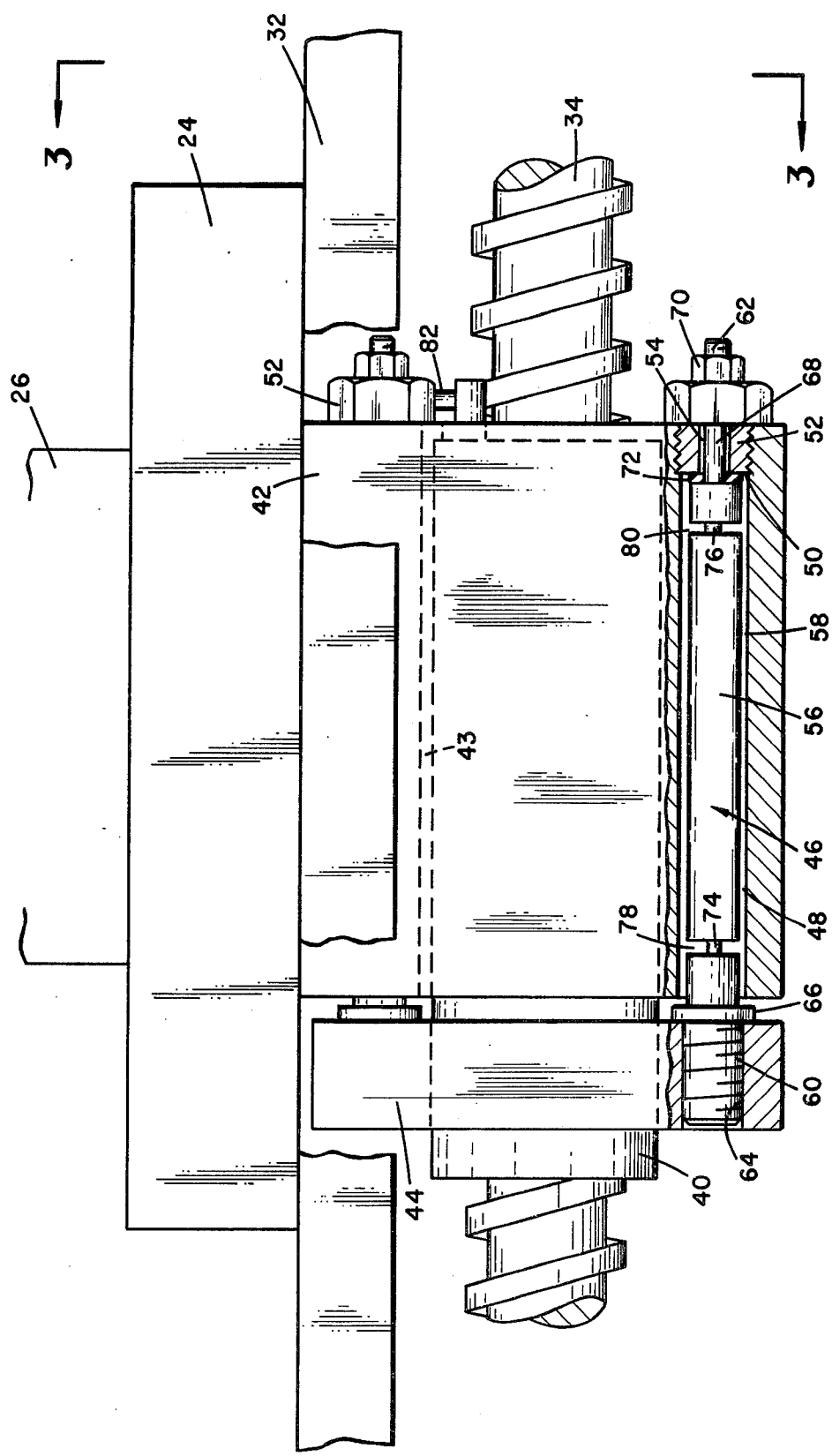
FIG. 2 is a vertical view partly broken away, of a lead screw ball nut and the machine tool carriage of FIG. 1 wherein the ball nut is coupled to the carriage by the flex bolts of the present invention.
Figure 3:
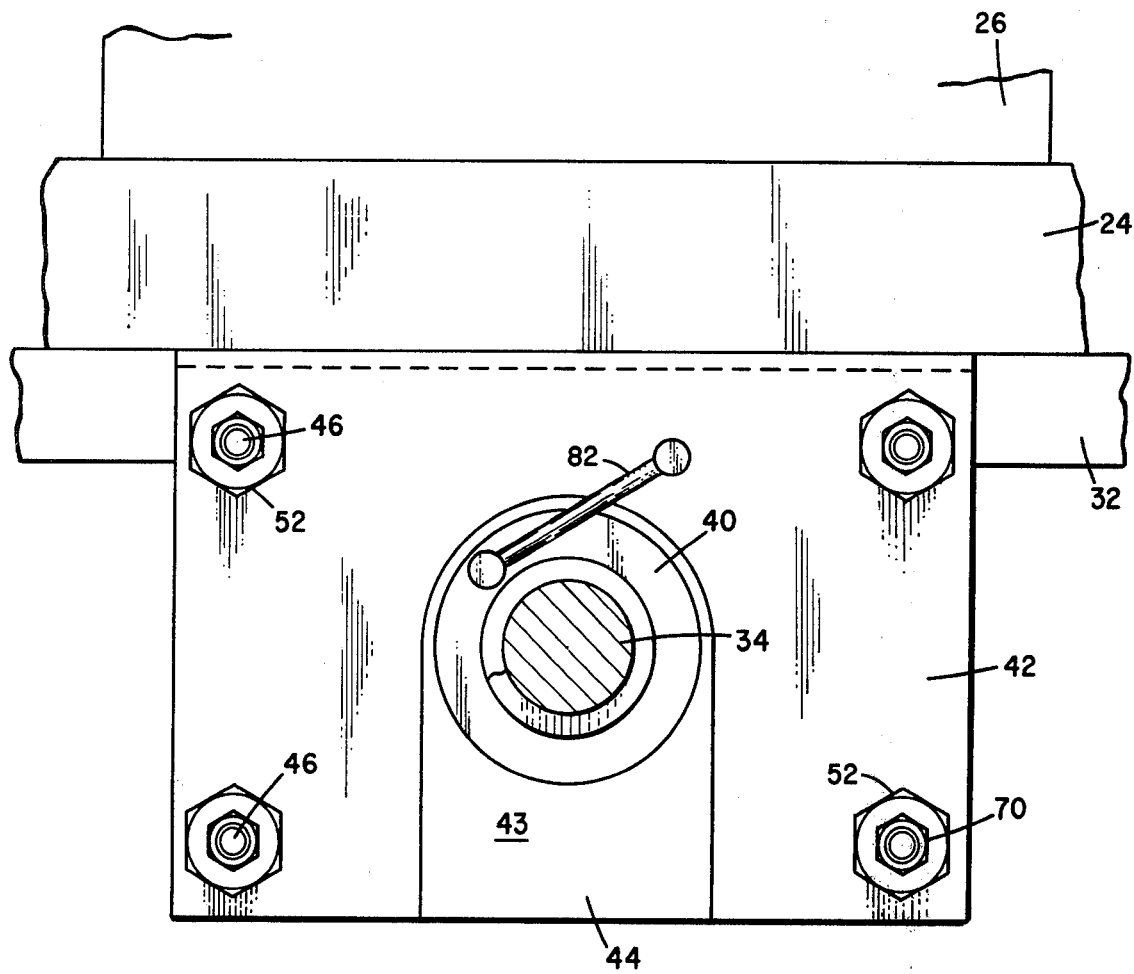
FIG. 3 is a sectional end view taken along lines 3—3 of FIG. 2 showing the position of the flex bolts of the present invention with respect to the lead screw and machine tool carriage.

As best shown in FIGS. 2 and 3 the carriage 24, which is the carriage for the tool post 26 and tool 28, is shown with the flexible coupling of the present invention. However, it is to be understood that the carriage 16 for the geared chuck 12 may be readily provided with the coupling of the present invention. In fact, the coupling of the present invention may be satisfactorily employed in any mechanism wherein a lead screw and ball nut are utilized in the machine.

The lead screw 34 is encompassed by an elongated ball nut 40 which extends over essentially the full length of a yoke shaped carriage support 42 which is utilized to attach the ball nut 40 to the carriage 24. The ball nut 40 is positioned within a cavity 43 of a generally U-shaped configuration in the yoke 42 in such a manner as to provide an annular space between the ball nut 40 and the yoke 42 as best shown in FIG. 3. The ball nut 40 is provided with a rectangularly shaped flange 44 which is axially separated from and attached to the yoke 42 by flex bolts 46.

In order to attach ball nut 40 to the carriage yoke 42 by the flex bolts 46, the yoke 42 is provided with axially extending throughgoing bores or passageways 48 at the corners of the yoke 42. These passageways 48 in the yoke are present and were previously used for effecting the ball nut-to-yoke couplings by a bolting arrangement. However, in accordance with the present invention, a modification of the conventional coupling is utilized so as to mount the ball nut 40 to the yoke 42 by flex bolts 46. The passageways 48 which extends through the previously made yokes are of uniform diameter throughout the entire length thereof. Thus, in order to employ the flexible coupling of the present invention, a shoulder such as generally shown at 50 is provided adjacent the end of the passageway 48 remote to the flange 44. This shoulder 50 may be readily formed by threading the end of the passageway 48 and inserting a short bolt 52 having a bore 54 extending therethrough. If the present invention is to be utilized with a new yoke, passageways 48 may be readily provided with shoulders, such as 50, therein during the formation thereof, so as to obviate the use of the short bolts 52.

The flex bolts 46 are each formed of a solid cylindrical rod of a diameter sufficiently large to assure axial stiffness of the bolt for accurately displacing the carriage in axial directions in response to rotation of the lead screw and yet of a diameter less than the passageway 48 so as to assure that an annular space 58 is maintained about the bolt 46 over the length thereof extending from the end near the flange 44 to the shoulder 50. The annular space 58 is of a width sufficient to assure that lateral displacement of the bolts 46 during rotation of a "bowed" lead screw will not cause contact between the bolts 46 and the yoke 42. The flex bolt 46 is threaded at both ends as shown at 60 and 62 with the threaded end 60 of the flex bolt 46 being received in threaded bores 64 of the flange 44. A shoulder 66 is provided on each of the flex bolts 46 near the innermost end of the threaded section 60 to assure uniform bolt penetration of the threaded section 60 into the flange 44 and to assure tight threads having no backlash or free motion in the threaded joint. The end section 68 of the flex bolt opposite the threads 60 is of a reduced diameter so as to project through the bore 54 in bolt 52 without contact therewith so as to facilitate movement of the end section 68 through the bolt 52. The threads 62 on end section 68 are adapted to receive a nut 70 for securing the bolt 46 to the yoke 42.

With the bolts 46 secured to the flange 44 and the nuts 70 tightened to a desired torque value the flexible coupling between the ball nut 40 and the carriage is established. To assure that the ball nut 40 is properly aligned on the lead screw 35, O-rings as shown at 72 may be disposed between the shoulder formed at the inner end of the smaller diameter portions 68 of the flex bolts and shoulder 50 at the end of bolts 52. The effective length of each flex bolt 46 may then be changed by adjusting the compression of the O-ring by rotation of nuts 70. Also by putting a slight tension on the bolts 46 through the use of the O-rings, backlash between the bolt threads 62 and the fastening nut 70 may be minimized due to the spring action of the O-ring In order to provide the hinging mechanism in the flex bolts 46 of the present invention each flex bolt is provided with a hinge forming section 74 and 76 adjacent each end thereof so as to isolate the lateral motion generated by the wobble in the lead screw 34. This hinge is effected by providing the flex bolt with an annular groove near each end to provide a solid bolt section of a substantially smaller diameter than that of the remainder of the flex bolt. For example, a satisfactory flex bolt with a diameter of 0.5 inch may be fabricated by providing annular grooves 78 and 80 adjacent opposite ends of the bolt with each groove being of a width in the order of about 0.0625 inch and a depth sufficient to leave a central solid section having a diameter in the order of about 0.0625 inch. With solid sections 74 and 76 of these dimensions the bolt still has sufficient rigidity and axial stiffness to assure that the carriage may be moved axially by the rotation of the lead screw without introducing error into the machine operation due to the presence of the grooves 78 and 80.

With the flex bolts being provided with the hinges, lateral movement of the ball nut due to the wobble in the lead screw is effectively isolated by the hinging action of the bolts in that the ball nut 40 and flange 44 may be laterally displaced by the lead screw wobble and yet this lateral displacement will not be translated to the carriage through the yoke since the flexible coupling between the ball nut and the carriage has sufficient flexure due to the hinging action of the bolts 46 to effectively isolate the wobble.

The translation of the rotary motion of the lead screw to the carriage 24 is enhanced by employing an anti-rotation bolt 82 which joins the ball nut 40 to the yoke 42 so as to assure that the rotation of the lead screw 34 imparts axial motion to the ball nut 40 and carriage 24 rather than any rotation thereof.

In a typical precision lathe having a lead screw with a wobble of 0.003 inch, and provided with the flexible coupling of the present invention, the wobble was sufficiently isolated in the ball nut so that the machine carriage had an uncontrolled lateral motion of only 8 microinchs due to the wobble.

Tests have indicated that the flexible coupling provides sufficient axial stiffness for stable control at 1 microinch resolution. If needed, any desired number of flex bolts could be used to join a ball nut and a machine carriage to assure adequate axial strength. The use of the O-rings assures that the flex bolts could be easily aligned so as to inhibit undesirable binding in the coupling.

It will be seen that the present invention affords a unique coupling between a lead screw ball nut and a carriage of a machine tool so as to virtually eliminate lateral motion in the carriage caused by the wobbling of the lead screw as it rotates within the ball nut.

What is claimed is:

1. In a machine tool utilized for machining a workpiece and comprising at least one carriage for supporting one of a tool and a workpiece, slide means for movably supporting the carriage, a ball nut, means for joining ball nut to the carriage, a lead screw engaging the ball nut for axially displacing the carriage along said slide means in reponse to rotation of the lead screw in said ball nut, said means for joining the ball nut to said carriage comprising a plurality of elongated bolt means secured at opposite ends thereof to said ball nut and said carriage for coupling said ball nut to said carriage, and hinge means on said bolt means intermediate said opposite ends which flex upon lateral movement of said ball nut due to wobble in the lead screw during rotation thereof for inhibiting the transferrence of the latter movement to said carriage.

2. In a machine tool as claimed in claim 1, wherein said carriage has a generally U-shaped cavity therein, said ball nut is of an elongated configuration and is positioned within said cavity a sufficient distance from wall portions of the carriage defining said cavity for preventing contact with said wall portions during said lateral movement, said ball nut has a flange being maintained at a location axially spaced from said carriage by said bolt means, said carriage has a plurality of elongated passageways therethrough for receiving said bolt means, said bolt means projecting through substantially the entire length of said passageways in a non-contacting relationship with the walls of said passageways, and wherein said hinge means are disposed in said passageways.

3. In a machine tool as claimed in claim 1 wherein said hinge means comprise a pair of axially spaced apart annular grooves in said bolt means with said grooves extending into said bolt means a distance sufficient to provide solid sections of substantially smaller diameter than the bolt portions adjacent said grooves.

4. In a machine tool as claimed in claim 3 wherein each of said passageways has a portion thereof of a smaller diameter than the remainder of said passageway with said smaller portion being disposed adjacent one end of said passageway remote to said flange and defining a shoulder within said passageway, one end of each said bolt means is secured to said flange, the other end of said bolt means projects through said portion of the passageway of smaller diameter, shoulder means are on said bolt means adjacent said other end for abutting against said shoulder in the passageway, and wherein nut means secure said other end of each bolt to said carriage and effect the abuttment of said shoulder means with said shoulder.

5. In a machine tool as claimed in claim 4, wherein deformable means are disposed between said shoulder means and said shoulder and selectively deformable by said nut means for axially aligning said ball nut with said carriage.

* * * * *